United States Patent
Ono et al.

(10) Patent No.: US 6,898,966 B2
(45) Date of Patent: May 31, 2005

(54) ROAD SURFACE FRICTION STATE ESTIMATING APPARATUS AND METHOD THEREOF

(75) Inventors: Eiichi Ono, Toyota (JP); Shoji Inagaki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 124 days.

(21) Appl. No.: 10/626,561

(22) Filed: Jul. 25, 2003

(65) Prior Publication Data

US 2005/0005691 A1 Jan. 13, 2005

(30) Foreign Application Priority Data

Aug. 12, 2002 (JP) ........................................ 2002-234505

(51) Int. Cl.$^7$ ............................................. G01M 17/02
(52) U.S. Cl. ........................................... 73/146; 701/80
(58) Field of Search ............................ 73/146, 862.325, 73/862.08; 701/80, 71; 303/140

(56) References Cited

U.S. PATENT DOCUMENTS

| | | | | |
|---|---|---|---|---|
| 3,956,391 A | * | 5/1976 | Houlihan et al. ........... 564/387 |
| 6,015,192 A | * | 1/2000 | Fukumura ................... 303/140 |
| 6,508,102 B1 | * | 1/2003 | Margolis et al. ................. 73/8 |
| 6,592,980 B1 | * | 7/2003 | MacDougall et al. ..... 428/304.4 |
| 6,792,343 B2 | * | 9/2004 | Yasui et al. .................... 701/71 |
| 6,802,226 B2 | * | 10/2004 | Ono et al. ............. 73/862.325 |
| 2002/0072841 A1 | * | 6/2002 | Kogure ........................ 701/80 |
| 2003/0051560 A1 | * | 3/2003 | Ono et al. .............. 73/862.08 |
| 2004/0133330 A1 | * | 7/2004 | Ono et al. .................... 701/80 |
| 2004/0186649 A1 | * | 9/2004 | Ono et al. .................... 701/80 |

FOREIGN PATENT DOCUMENTS

JP A 6-221968 8/1994

* cited by examiner

Primary Examiner—Michael Cygan
Assistant Examiner—Andre Allen
(74) Attorney, Agent, or Firm—Oliff & Berridge, PLC (57) ABSTRACT

A SAT estimating portion supplies a grip degree estimating portion with the estimated SAT value. A summing device sums a front wheel slip angle on which high pass filter processing has been performed and a front wheel slip angle on which low pass filter processing has been performed so as to obtain an integrated slip angle. A grip degree estimating portion estimates a grip degree of a tire, by calculating a SAT reference value which is based on the integrated slip angle, and calculating a ratio between the SAT reference value and the estimated SAT value. A road surface $\mu$ value estimating portion estimates a road surface $\mu$ value when the grip degree becomes equal to or lower than a reference value.

10 Claims, 11 Drawing Sheets

ROAD SURFACE FRICTION STATE ESTIMATING APPARATUS AND METHOD THEREOF

INCORPORATION BY REFERENCE

The disclosure of Japanese Patent Application No. 2002-234505 filed on Aug. 12, 2002 including the specification, drawings and abstract is incorporated herein by reference in its entirety.

BACKGROUND OF THE INVENTION

1. Field of the Invention

The invention relates to a road surface friction state estimating apparatus. More particularly, the invention relates to a road surface friction state estimating apparatus which estimates a road surface friction state using self aligning torque generated in a tire of a vehicle, and a method thereof.

2. Description of the Related Art

As related art 1 of the invention, Japanese Patent Laid-Open Publication No. 6-221968 discloses a road surface friction coefficient detecting apparatus which estimates a grip state using self aligning torque (hereinafter, referred to as "SAT").

The apparatus according to the related art 1 estimates a grip state based on SAT and a front wheel lateral force which are calculated based on vehicle movement. According to the related art 1, it is possible to accurately estimate a grip state even when the vehicle runs on a bank road surface, or when a relation between a lateral force and a slip angle is non-linear.

However, the apparatus according to the related art 1 is likely to be influenced by road surface disturbance. Also, when steering is performed quickly, the phase of the calculated SAT value and that of the calculated lateral force value are deviated from each other. Accordingly, a grip state cannot be accurately estimated.

As another related art 2 of the invention, Japanese Patent Application No. 2001-212683 discloses art in which a front wheel slip angle is estimated based on a steering angle, SAT is estimated by removing friction of a steering system from a sum of steering torque supplied by a driver and assist torque applied to a power steering device, and a grip state is estimated based on the front wheel slip angle and SAT.

However, according to the related art 2, a grip state cannot be accurately estimated when the relation between the lateral force and the slip angle becomes non-linear and accordingly the front wheel slip angle cannot be accurately estimated in the case where the steering angle is 0 and SAT is not 0 during running on a bank road surface.

SUMMARY OF THE INVENTION

In order to solve the aforementioned problem, the invention is proposed. Accordingly, it is an object of the invention to provide a road surface friction state estimating apparatus which can accurately estimate a road surface friction state without being influenced by road surface disturbance even when steering is performed quickly, and a method thereof.

A road surface friction state estimating apparatus according to a first aspect of the invention includes a self aligning torque estimating portion which estimates self aligning torque; a slip angle estimating portion which estimates a slip angle; a high pass filter which performs high pass processing on the slip angle estimated by the slip angle estimating portion; a lateral force calculating portion which calculates a lateral force; a slip angle converting portion which converts the lateral force calculated by the lateral force calculating portion into a slip angle; a low pass filter which performs low pass filter processing on the slip angle obtained by conversion by the slip angle converting portion; a summing portion which sums the slip angle on which the high pass filter processing has been performed by the high pass filter and the slip angle on which the low pass filter processing has been performed by the low pass filter; and a road surface friction state estimating portion which estimates a road surface friction state based on the slip angle obtained by summation by the summing portion and the self aligning torque estimated by the self aligning torque portion.

The self aligning torque estimating portion estimates self aligning torque generated in a tire. The invention is not limited to a specific method of estimating self aligning torque. The slip angle estimating portion estimates the slip angle of the tire.

The high pass filter performs high pass filter processing on the slip angle estimated by the slip angle estimating portion, thereby removing a drift error contained in the slip angle estimated by the slip angle estimating portion, and extracting a high-frequency component of the slip angle, which does not have a phase lag with respect to the self aligning torque.

The lateral force calculating portion calculates the lateral force generated in the tire. Since there is a substantially linear relation between the lateral force and the slip angle, the slip angle converting portion converts the lateral force into the slip angle based on this relation. The low pass filter performs low pass filter processing on the slip angle obtained by conversion by the slip angle converting portion, thereby removing a variation component such as disturbance noise contained in a high frequency region, and extracting an accurate low-frequency component during running on a bank road.

The summing portion sums the slip angle on which the high pass filter processing has been performed and the slip angle on which the low pass filter processing has been performed, thereby obtaining the slip angle which does not have disturbance noise, a drift error, or a phase lag with respect to the self aligning torque.

The road surface friction state estimating portion estimates a road surface friction state, that is, a friction state between the tire and the road surface, based on the slip angle obtained by summation by the summing portion and the self aligning torque estimated by the self aligning torque estimating portion.

Therefore, according to the first aspect of the invention, it is possible to accurately estimate a road surface friction state without being influenced by disturbance noise or a drift error even during running on a straight horizontal road or a bank road.

Further, in the road surface friction state estimating apparatus according to the first aspect of the invention, the high pass filter and the low pass filter may have the same breakpoint frequency. Further, the sum of a transfer function of the high pass filter and a transfer function of the low pass filter is preferably 1. Thus, when the same signal is input to the high pass filter and the low pass filter, and outputs of both the filters are summed, the original signal is restored.

Therefore, according to the aspect, it is possible to obtain a slip angle which does not have disturbance noise or a drift error. Thus, it is possible to accurately estimate a road surface friction state using the slip angle.

Also, the value of the breakpoint frequency of the high pass filter and the low pass filter may be set according to a vehicle movement state. The vehicle movement state includes a vehicle speed, a turning state, and the like.

For example, when a vehicle enters a bank road from a straight horizontal road, the breakpoint frequency of the high pass filter and the low pass filter needs to be equal to or higher than a road surface cant change speed, that is, a speed at which a cant of a road surface changes. The road surface cant change speed is proportional to the vehicle speed. Therefore, when the breakpoint frequency is set so as to be higher in proportion to the vehicle speed, it is possible to accurately estimate a road surface friction state even when the vehicle enters a bank road.

For example, when a spin occurs, the breakpoint frequency of the high pass filter and the low pass filter may be set so as to be higher as a deviation between the slip angle estimated by the slip angle estimating portion and the slip angle obtained by conversion by the slip angle converting portion is larger.

The deviation is large when the vehicle runs on a bank road, or when the relation between the lateral force and the slip angle is non-linear. In such a case, the accuracy of the slip angle estimated by the slip angle estimating portion deteriorates. Therefore, it is preferable to use the slip angle into which the lateral force is converted. Thus, when the breakpoint frequency is set in the manner described above, it is possible to accurately estimate a road surface friction state even if the vehicle suddenly enters a bank road, or a spin suddenly occurs.

Accordingly, by setting the breakpoint frequency according to a vehicle movement state, it is possible to accurately estimate a road surface friction state even if the vehicle enters a bank road from a straight horizontal road, or a spin suddenly occurs.

Also, in the road surface friction state estimating apparatus according to the first aspect of the invention, the road surface friction state estimating portion may calculate a self aligning torque reference value based on the slip angle obtained by summation by the summing portion, and may estimate a grip degree based on a ratio between the self aligning torque reference value and the self aligning torque estimated by the self aligning torque estimating portion.

Thus, according to the aspect of the invention, the self aligning torque reference value is calculated based on the slip angle which is not influenced by road surface disturbance and which does not have a drift error, and the grip degree is estimated based on the ratio between the self aligning torque reference value and the self aligning torque. Therefore, it is possible to accurately estimate the grip degree equivalent to an excess of a frictional force in the lateral direction.

Further, the road surface friction state estimating portion may estimate a road surface friction coefficient based on the grip degree and the lateral acceleration.

By using the estimated grip degree when estimating the road surface friction coefficient, it is possible to accurately estimate the road surface friction coefficient. The road surface friction coefficient may be estimated when the grip degree is equal to or lower than a predetermined reference value.

A method of estimating a road surface friction state according to a second aspect of the invention includes the steps of estimating self aligning torque; estimating a slip angle; performing high pass filter processing on the estimated slip angle; calculating a lateral force applied to a tire; converting the calculated lateral force into a slip angle; performing low pass filter processing on the slip angle obtained by conversion; summing the slip angle on which the high pass filter processing has been performed and the slip angle on which the low pass filter has been performed; and estimating a road surface friction state based on the slip angle obtained by summation and the estimated self aligning torque.

According to the second aspect of the invention, it is possible to obtain the slip angle which does not have disturbance noise or a drift error. Thus, by using the slip angle, it is possible to accurately estimate a road surface friction state.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Hereinafter, preferred embodiments of the invention will be described in detail with reference to the accompanying drawings.

Figure 1:
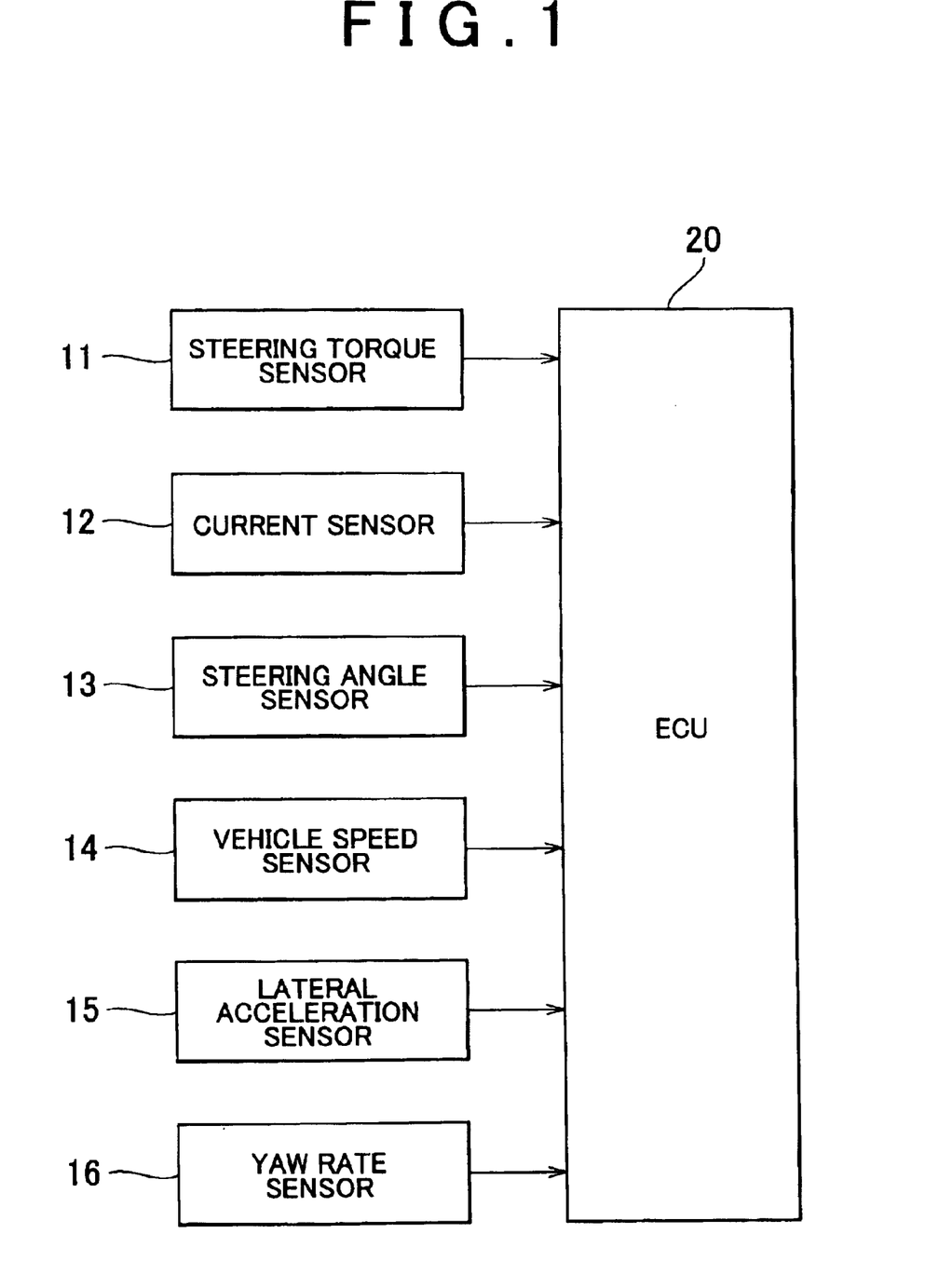
FIG. 1 is a block diagram showing a configuration of a road surface friction state estimating apparatus according to an embodiment of the invention.

FIG. 1 is a block diagram showing a configuration of a road surface friction state estimating apparatus according to an embodiment of the invention. The road surface friction state estimating apparatus can be employed, for example, in a vehicle provided with an electric power steering device. Also, the road surface friction state estimating apparatus can be employed in a vehicle provided with a hydraulic power steering device, as described later.

The road surface friction state estimating apparatus includes a steering torque sensor 11 which detects steering torque, a current sensor 12 which detects motor current, a steering angle sensor 13 which detects a steering angle, a vehicle speed sensor 14 which detects a vehicle speed, a lateral acceleration sensor 15 which detects a lateral acceleration, a yaw rate sensor 16 which detects a yaw rate, and an electronic control unit (hereinafter, referred to as "ECU") 20 which estimates a road surface friction state using signals output from the sensors.

The steering torque sensor 11 is disposed coaxially with a steering shaft. The steering torque sensor 11 outputs a sensor signal according to steering torque applied to a steering shaft, and supplies the sensor signal to the ECU 20. The current sensor 12 outputs a sensor signal according to the motor current of an electric motor which is used in the electric power steering device, and supplies the sensor signal to the ECU 20.

The steering angle sensor 13 outputs a sensor signal according to a steering angle $\theta_P$ due to the driver's steering operation, and supplies the sensor signal to the ECU 20. The vehicle speed sensor 14 outputs a sensor signal according to a vehicle speed (a vehicle body speed) u, and supplies the sensor signal to the ECU 20.

The lateral acceleration sensor 15 outputs a sensor signal according to an acceleration in a lateral direction of the vehicle (a lateral acceleration), and supplies the sensor signal to the ECU 20. The yaw rate sensor 16 outputs a sensor signal according to a yaw rate which is a rotational angular speed around a center of gravity of the vehicle, and supplies the sensor signal to the ECU 20.

Figure 2:
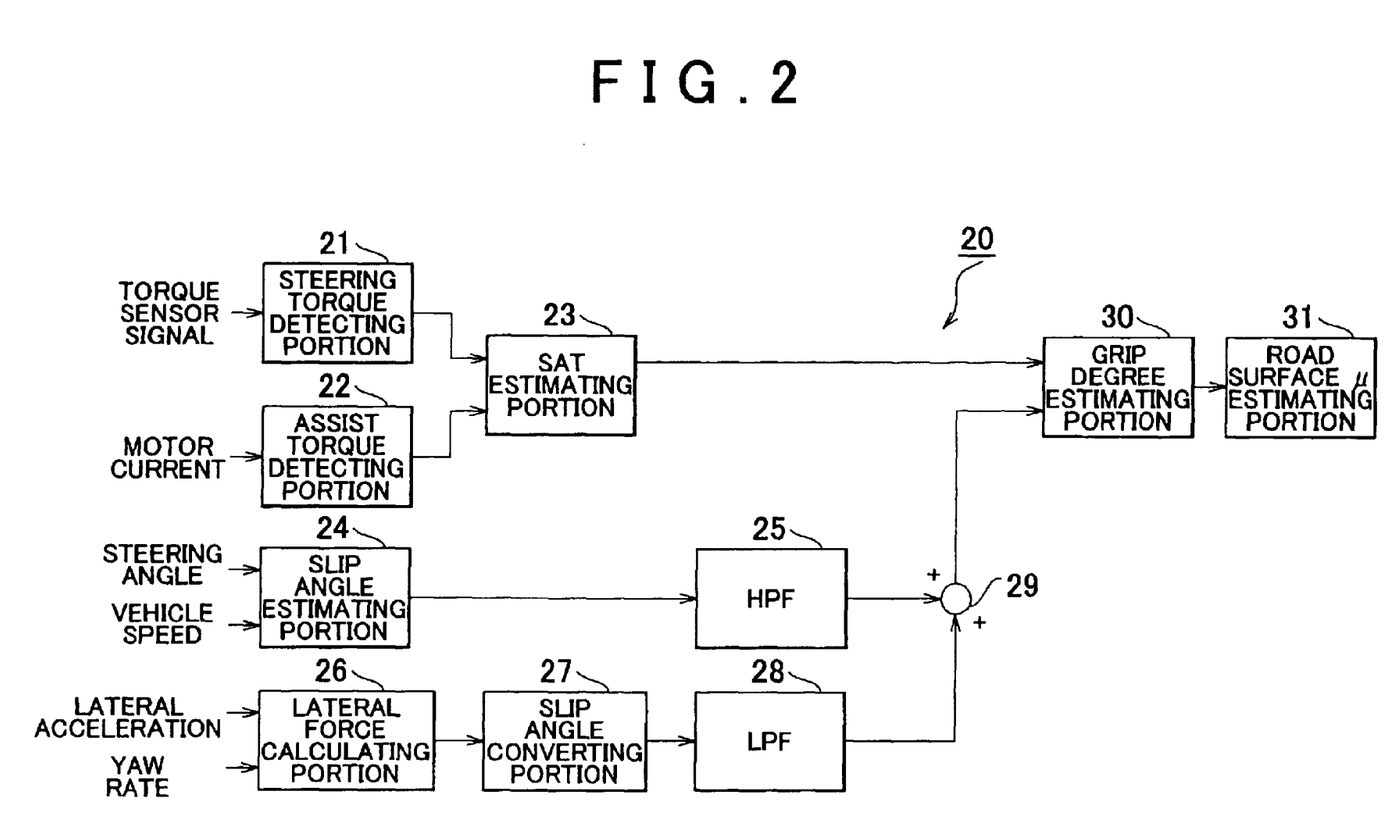
FIG. 2 is a block diagram showing a functional configuration of an electric control unit (ECU)

FIG. 2 is a block diagram showing a functional configuration of the ECU 20.

The ECU 20 includes a steering torque detecting portion 21 which detects steering torque; an assist torque detecting portion 22 which detects assist torque; a SAT estimating portion 23 which estimates SAT; a slip angle estimating portion 24 which estimates a slip angle; and a high pass filter 25 which performs high pass filter processing on the slip angle.

The ECU 20 further includes a lateral force calculating portion 26 which calculates a front wheel lateral force of the vehicle; a slip angle converting portion 27 which converts the front wheel lateral force into a slip angle; a low pass filter 28 which performs low pass filter processing on the slip angle obtained by conversion; a summing device 29 which sums two slip angles on each of which the filter processing has been performed; and a grip degree estimating portion 30 which estimates a grip degree; and a road surface $\mu$ value estimating portion 31 which estimates a road surface friction coefficient $\mu$ (hereinafter, referred to as "a road surface $\mu$ value").

The steering torque detecting portion 21 detects steering torque applied due to the driver's steering operation based on the sensor signal from the steering torque sensor 11, and supplies the detected steering torque to the SAT estimating portion 23.

The assist torque detecting portion 22 detects the assist torque applied to the electric power steering device, based on the motor current based on the sensor signal from the current sensor 12 and a preset parameter (for example, a lead of a pinion, a lead of a ball screw, or an assist motor torque coefficient), and supplies the assist torque to the SAT estimating portion 23. The assist torque detecting portion 22 may use a current command value output to a motor of the electric power steering device, instead of the motor current.

The SAT estimating portion 23 calculates a sum of the steering torque detected by the steering torque detecting portion 21 and the assist torque detected by the assist torque detecting portion 22, thereby estimating SAT generated between a road surface and a tire, while removing friction of a steering system.

Figure 3:
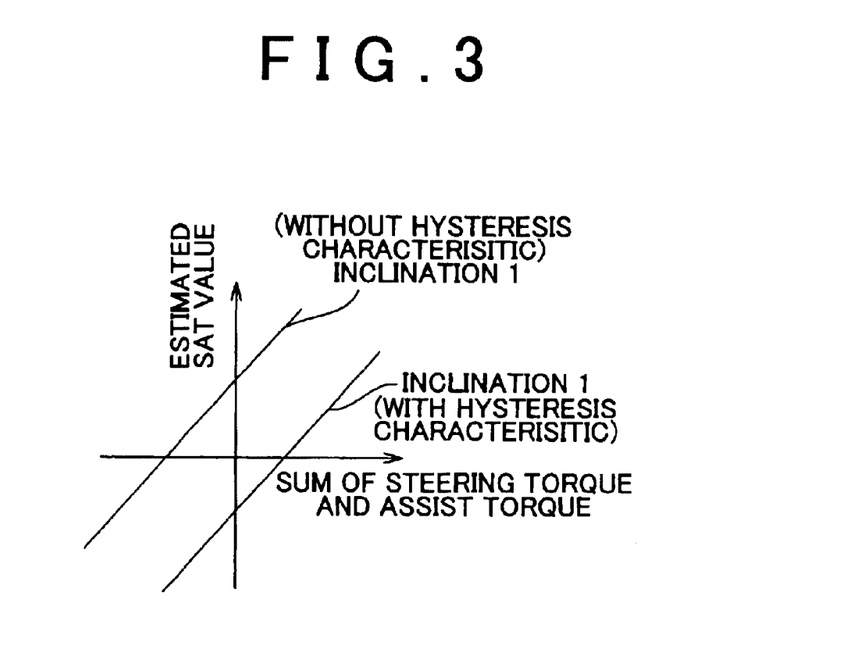
FIG. 3 is a chart showing an estimated SAT value with respect to a sum of steering torque and assist torque.

FIG. 3 is a chart showing an estimated SAT value with respect to the sum of the steering torque and the assist torque. A width between two straight lines shows a magnitude of a hysteresis characteristic due to the friction of the steering system. An inclination of each straight line is 1.

Figure 4:
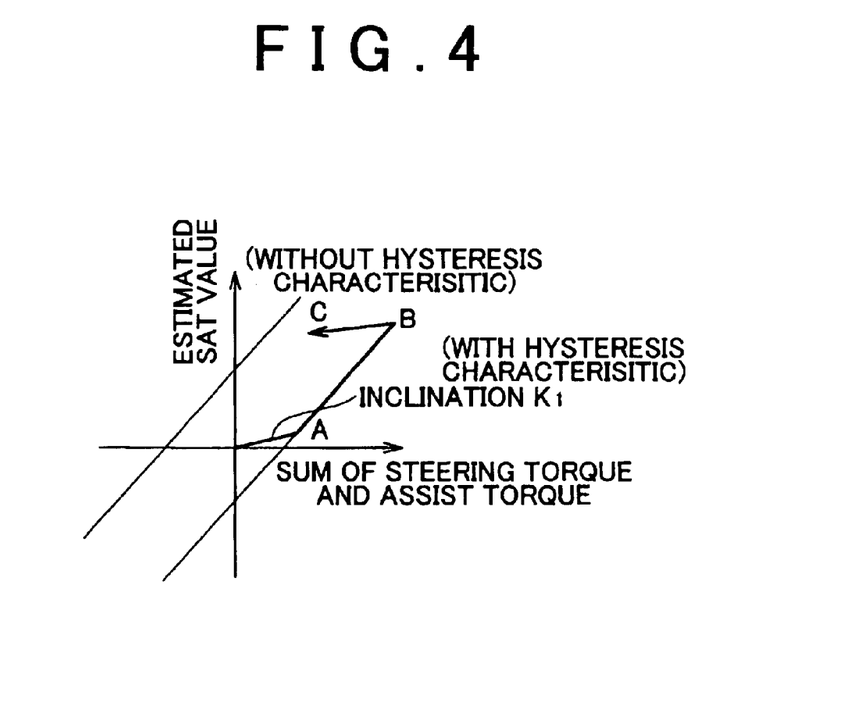
FIG. 4 is a chart showing the estimated SAT value with respect to the sum of the steering torque and the assist torque, for describing a method of removing a hysteresis characteristic.

FIG. 4 is a chart showing the estimated SAT value with respect to the sum of the steering torque and the assist torque, for describing a method of removing the hysteresis characteristic.

When the sum of the steering torque and the assist torque is 0 and the slip angle is also 0 while the vehicle moves straight, hysteresis does not occur, and the estimated SAT value is 0.

When steering is performed and SAT is generated, the estimated SAT value is calculated using an inclination $K_1$ with respect to the sum of the steering torque and the assist torque. More specifically, the SAT estimating portion 23 performs a calculation according to the following equation (1) using a discrete logic.

$$T_{SAT}(k+1)=T_{SAT}(k)+K_1 \cdot (T_{DA}(k+1)-T_{DA}(k)) \quad (1)$$

In the equation, $T_{SAT}$ is the estimated SAT value, $T_{DA}$ is the sum of the steering torque and the assist torque. The inclination $K_1$ is set to be smaller than 1 in order to indicate that a variation in the estimated SAT value is small even when the sum of the steering torque and the assist torque varies due to Coullomb Friction or the like.

When steering is performed, the estimated SAT value obtained according to the equation (1) reaches a point A in FIG. 4. Further, when the sum of the steering torque and the assist torque increases, the estimated SAT value increases according to a straight line which indicates a lower limit of the model, that is, the estimated SAT value increases according to an equation (2).

$$T_{SAT}(k+1)=T_{SAT}(k)+T_{DA}(k+1)-T_{DA}(k) \quad (2)$$

When steering is performed further, the estimated SAT value reaches a point B at which the steering angle stops increasing, and then the sum of the steering torque and the assist torque decreases, the estimated SAT value decreases according to the equation (1) using the inclination $K_1$. In this region, the estimated SAT value is set such that a variation in the estimated SAT value is small with respect to a variation in the sum of the steering torque and the assist torque. The estimated SAT value is thus set so as not to be influenced by the Coullomb Friction of the power steering device, or the like even if the steering force supplied by the driver varies to a certain degree when the steering angle is maintained while the vehicle is turning.

When the estimated SAT value decreases from the point B to a point C, and then the sum of the steering torque and the assist torque increases, the estimated SAT value increases toward the point B according to the equation (1). Also, when the sum of the steering torque and the assist torque decreases from the point C due to a decrease in the steering angle, and the estimated SAT value reaches an upper limit of the model, the estimated SAT value decreases according to a straight line indicating the upper limit, that is, the estimated SAT value decreases according to the equation (2). Setting two types of inclinations in this way removes the hysteresis characteristic.

Figure 5A:
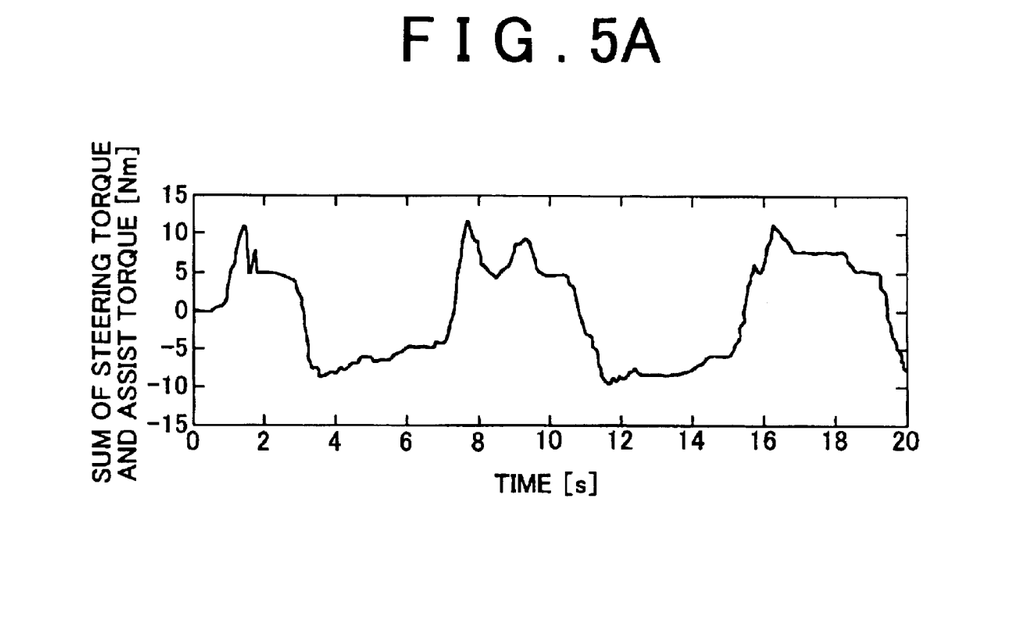
FIG. 5A is a chart showing a time-dependent change in the sum of the steering torque and the assist torque during running on a road having a high $\mu$ value.
Figure 5B:
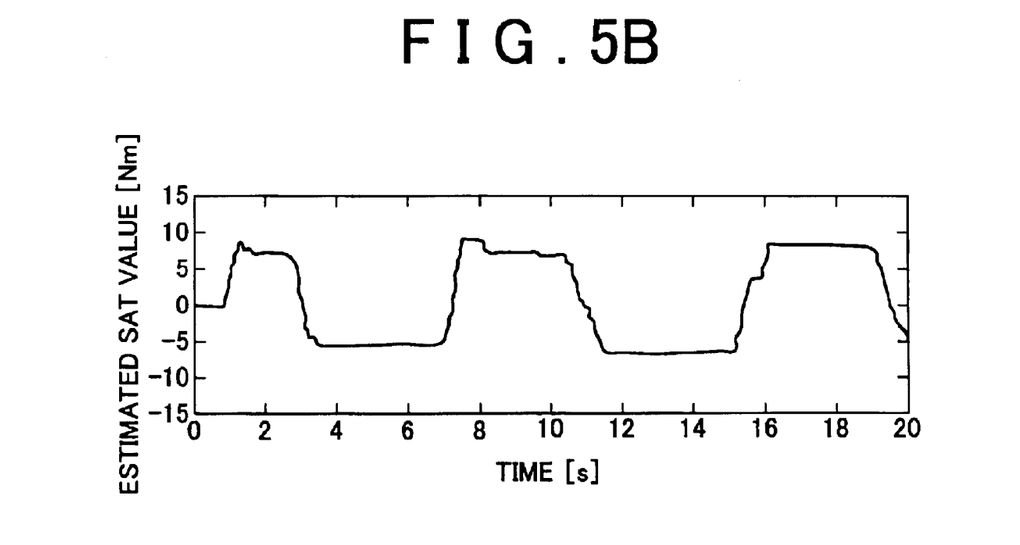
FIG. 5B is a chart showing a time-dependent change in the estimated SAT value during running on the road having a high $\mu$ value.

FIG. 5A is a chart showing a time-dependent waveform of the sum of the steering torque and the assist torque during running on a road having a high $\mu$ value, and FIG. 5B is a chart showing a time-dependent waveform of the estimated SAT value during running on the road having a high $\mu$ value. The estimated SAT value in FIG. 5B is obtained by removing the hysteresis characteristic from the sum of the steering torque and the assist torque in FIG. 5A according to the equations (1) and (2). By removing the hysteresis characteristic, a variation in the estimated SAT value when the steering angle is maintained, which is assumed to be caused by influence such as Coullomb Friction, can be almost completely compensated.

Figure 6A:
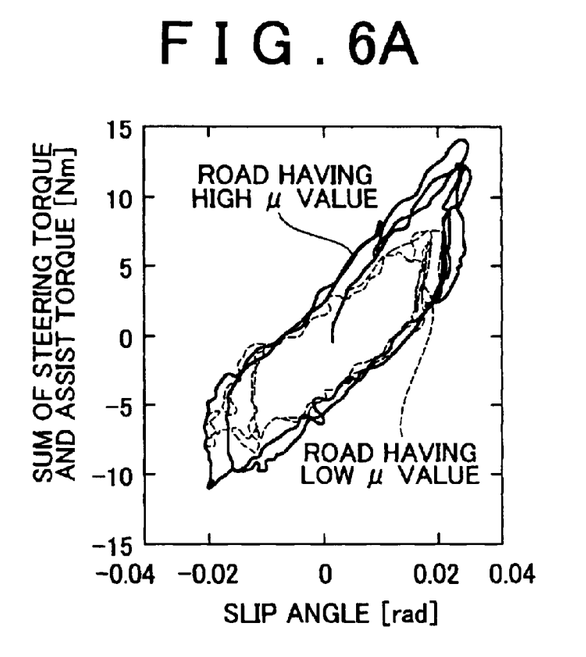
FIG. 6A is a chart showing a relation of the sum of the steering torque and the assist torque with respect to a slip angle during running on a road having a high $\mu$ value and during running on a road having a low $\mu$ value.
Figure 6B:
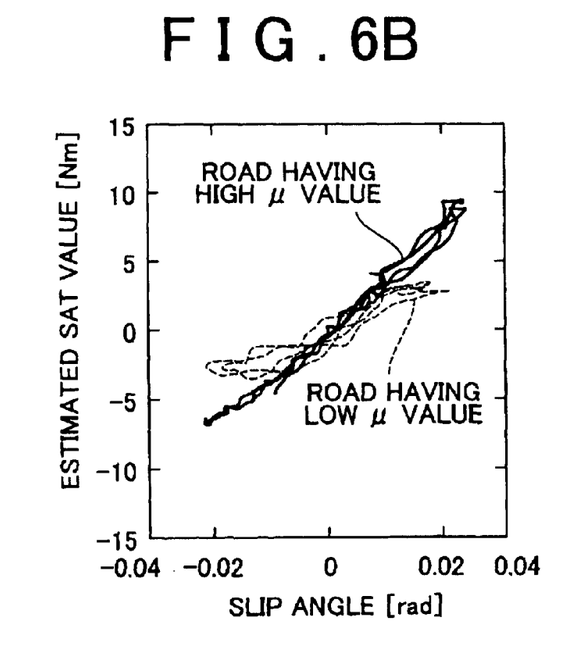
FIG. 6B is a chart showing a relation of the estimated SAT value with respect to the slip angle during running on the road having a high $\mu$ value and during running on the road having a low $\mu$ value.

FIG. 6A is a chart showing a relation of the sum of the steering torque and the assist torque with respect to a slip angle during running a road having a high $\mu$ value and during running on a road having a low $\mu$ value. FIG. 6B is a chart showing a relation of the estimated SAT value with respect to the slip angle during running on the road having a high $\mu$ value and during running on the road having a low $\mu$ value. In FIG. 6B, the estimated SAT value changes substantially linearly with respect to the slip angle both in the case of running on the road having a high $\mu$ value and in the case of running on the road having a low $\mu$ value. Therefore, it is apparent from FIG. 6B that the hysteresis characteristic is removed.

The slip angle estimating portion 24 estimates a front wheel slip angle $\alpha_E$ [rad] which is a slip angle of a front tire, based on a steering angle $\theta_P$ [rad] and a vehicle speed u [n/s]. The steering angle $\theta_P$ is based on the sensor signal from the steering angle sensor 13, and the vehicle speed u is based on the sensor signal from the vehicle speed sensor 14. The front wheel slip angle $\alpha_E$ is represented by state equations (3) and (4), using dynamic characteristics of the vehicle movement.

In the equations, v is a lateral speed [m/s], r is a yaw rate [rad/s], u is a vehicle speed [m/s], $c_f$ is a front wheel cornering power [N/rad], $c_r$ is a rear wheel cornering power [N/rad], $L_f$ is a distance between a front axle and a center of gravity of the vehicle [m], $L_r$ is a distance between a rear axle and a center of gravity [m] of the vehicle, M is a vehicle mass [kg], $I_Z$ is yaw inertia [kgm$^2$], and $g_h$ is a steering gear ratio.

By making the equations (3) and (4) discrete using a sample time $\tau$ so that they become functions of the vehicle u, the following equations (5) and (6) are obtained.

$$x(k+1) = \left( \begin{bmatrix} 1 & 0 \\ 0 & 1 \end{bmatrix} + \begin{bmatrix} 0 & -\tau \\ 0 & 0 \end{bmatrix} u(k) + \tau A_S / u(k) \right) x(k) + \tau B_S \theta_P(k) \quad (5)$$

$$\alpha_E(k) = [1 \ L_f] \times (k) / u(k) - \theta_P(k)/g_h \quad (6)$$

In the equations, k is a sampling number. Also, $A_s$ and $B_s$ in the equation (5) are represented by the following equations (7).

$$A_S = \begin{bmatrix} -\dfrac{c_f + c_r}{M} & -\dfrac{L_f c_f - L_r c_r}{M} \\ -\dfrac{L_f c_f - L_r c_r}{I_Z} & -\dfrac{L_f^2 c_f + L_r^2 c_r}{I_Z} \end{bmatrix}, \quad B_S = \begin{bmatrix} \dfrac{c_f}{M g_h} \\ \dfrac{L_f c_f}{I_Z g_h} \end{bmatrix} \quad (7)$$

The slip angle estimating portion 24 estimates the front wheel slip angle $\alpha_E$ by performing calculations according to the equations (5) to (7), and supplies the front wheel slip angle $\alpha_E$ to the high pass filter 25 every sample time $\tau$.

The high pass filter 25 performs high pass filter processing on the front wheel slip angle $\alpha_E$ estimated by the slip angle estimating portion 24. When a steering neutral point moves during running on a bank road, the front wheel slip angle $\alpha_E$ estimated by the slip angle estimating portion 24 contains a drift error in a low frequency region, but contains a signal component which does not have a phase lag with respect to the estimated SAT value in a high frequency region. Therefore, the high pass filter 25 removes the drift error in the low frequency region and extracts only the high frequency component which does not have a phase lag with respect to the estimated SAT value, by performing the high pass filter processing on the front wheel slip angle $\alpha_E$.

The high pass filter 25 is configured as a primary discrete filter. The primary high pass filter during a continuous time is represented by the equation (8) which is a transfer function.

$$G_H(s) = \dfrac{s}{s + \omega_b} \quad (8)$$

In the equation, $\omega_b$ is a breakpoint frequency. The high pass filter during a discrete time can be designed by transforming the equation (8), for example, by a Tustin transform.

$$\dfrac{d}{dt}\begin{bmatrix} v \\ r \end{bmatrix} = \left( \begin{bmatrix} 0 & -1 \\ 0 & 0 \end{bmatrix} u + \begin{bmatrix} -\dfrac{c_f + c_r}{M} & -\dfrac{L_f c_f - L_r c_r}{M} \\ -\dfrac{L_f c_f - L_r c_r}{I_Z} & -\dfrac{L_f^2 c_f + L_r^2 c_r}{I_Z} \end{bmatrix} / u \right) \begin{bmatrix} v \\ r \end{bmatrix} + \begin{bmatrix} \dfrac{c_f}{M g_h} \\ \dfrac{L_f c_f}{I_Z g_h} \end{bmatrix} \theta_P \quad (3)$$

$$\alpha_E = [1 \ L_f] / u \begin{bmatrix} v \\ r \end{bmatrix} - \dfrac{\theta_P}{g_h} \quad (4)$$

In the Tustin transform, when the sampling time is T and a time lead operator is z, a differential sign s is represented by the equation (9).

$$s = \frac{2(z-1)}{T(z+1)} \quad (9)$$

By substituting the equation (9) into the equation (8), the high pass filter during a discrete time is represented by the equation (10).

$$G_L(z) = \frac{2(z-1)}{(T\omega_b + 2)z + T\omega_b - 2} \quad (10)$$

The high pass filter 25 performs the high pass filter processing on the front wheel slip angle $\alpha_E$ according to the equation (10), and supplies the summing device 29 with the front wheel slip angle $\alpha_E$ on which the high pass filter processing has been performed.

The lateral force calculating portion 26 calculates a front wheel lateral force $F_f$ which is a lateral force generated in a front tire, using a lateral acceleration $g_y$ and a yaw rate r. The lateral acceleration $g_y$ is based on the sensor signal from the lateral acceleration sensor 15, and the yaw rate r is based the sensor signal from the yaw rate sensor 16. The front wheel lateral force $F_f$ satisfies the equation of motion (11) concerning the lateral acceleration $g_y$, and satisfies the equation of motion (12) concerning the yaw rate r.

$$M\left(\frac{dv}{dt} + ru\right) = F_f + F_r \quad (11)$$

$$I_z \frac{dr}{dt} = L_f F_f - L_r F_r \quad (12)$$

In the equations, $F_r$ is a rear lateral force. The lateral acceleration $g_y$ is represented by the following equation (13).

$$g_y = \frac{dv}{dt} + ru \quad (13)$$

Based on the equations (11) and (12), the front wheel lateral force $F_f$ is represented by the following (14).

$$F_f = \frac{L_r M g_y + I_z \frac{dr}{dt}}{L_f + L_r} \quad (14)$$

The lateral force calculating portion 26 calculates the front wheel lateral force $F_f$ using the yaw rate r and the lateral acceleration $g_y$ according to the equation (14), and supplies the slip angle converting portion 27 with the front wheel lateral force $F_f$.

The slip angle converting portion 27 converts the front wheel lateral force $F_f$ into a front wheel slip angle $\alpha_T$ by dividing the front wheel lateral force $F_f$ supplied by the lateral force calculating portion 26 by a front wheel cornering power $c_f$. More specifically, the slip angle converting portion 27 performs a calculation according to the following equation (15).

$$\alpha_T = -\frac{F_f}{c_f} \quad (15)$$

The low pass filter 28 performs low pass filter processing on the front wheel slip angle $\alpha_T$ calculated by the slip angle converting portion 27. The front wheel slip angle $\alpha_T$ calculated by the slip angle converting portion 27 contains, in the high frequency region, a variation component such as noise due to road surface disturbance and a phase lag. However, the front wheel slip angle $\alpha_T$ contains the low frequency component which is not influenced by the road surface disturbance even when the vehicle runs on a bank road. Thus, the low pass filter 28 removes the variation component in the high frequency region and extracts only the low frequency component which is accurately calculated, by performing the low pass filter processing on the front wheel slip angle $\alpha_T$.

More particularly, the low pass filter 28 is configured as a primary discrete filter having the same breakpoint frequency as that of the high pass filter 25. The primary low pass filter during a continuous time is represented by the following equation (16) which is a transfer function.

$$G_L(s) = \frac{\omega_b}{s + \omega_b} \quad (16)$$

The low pass filter during a discrete time is obtained by transforming the equation (16) by the Tustin transform, and is represented by the following equation (17).

$$G_L(s) = \frac{T\omega_b(z+1)}{(T\omega_b + 2)z + T\omega_b - 2} \quad (17)$$

The low pass filter 28 performs the low pass filter processing on the front wheel slip angle $\alpha_T$ according to the equation (17), and supplies the summing device 29 with the front wheel slip angle $\alpha_T$ on which the filter processing has been performed.

The invention is not limited to a specific breakpoint frequency. However, the breakpoint frequency is preferably set so as to change in accordance with a road surface cant change speed in order to remove noise due to road surface disturbance.

The summing device 29 calculates an integrated slip angle $\alpha_I$ by summing the front wheel slip angle $\alpha_E$ supplied by the high pass filter 25 and the front wheel slip angle $\alpha_T$ supplied by the low pass filter 28. In other words, the summing device 29 performs a calculation according to the following equation (18).

$$\alpha_I(Z) = G_H(Z) \cdot \alpha_E(Z) + G_L(Z) \cdot \alpha_T(Z) \quad (18)$$

The sum of the transfer function of the high pass filter 25 and the transfer function of the low pass filter 28 is 1. Therefore, when the same signal is input to the high pass filter and the low pass filter, and outputs of both the filters are summed, the original signal is restored. Accordingly, the summing device 29 can calculate the slip angle $\alpha_I$ which is not influenced by a drift error or noise.

Figure 7:
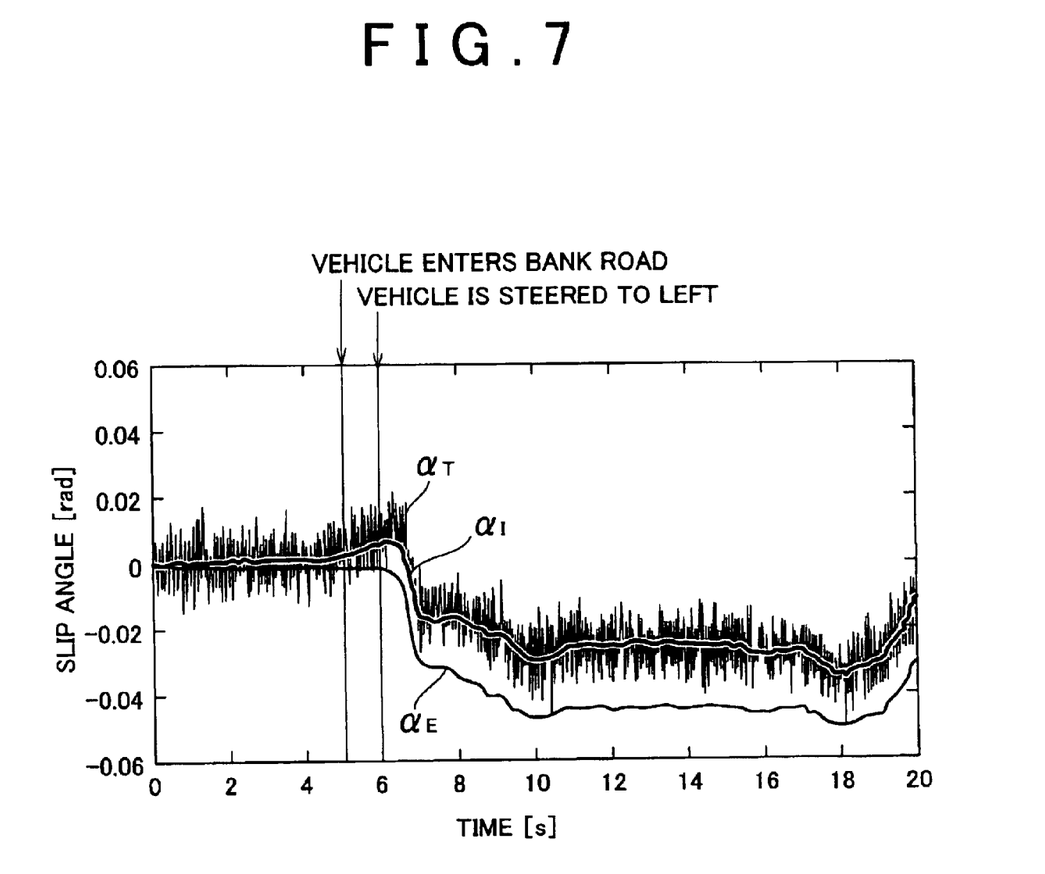
FIG. 7 is a chart showing time-dependent waveforms of an estimated slip angle value $\alpha_E$, a converted slip angle value $\alpha_T$, and an integrated slip angle $\alpha_I$ when the vehicle enters a bank road.

FIG. 7 is a chart showing time-dependent waveforms of the estimated slip angle value $\alpha_E$, the converted slip angle value $\alpha_T$ (i.e., the slip angle value obtained by conversion), and the integrated slip angle $\alpha_I$ when the vehicle enters a bank road. In this experiment, the vehicle entered a bank road around 5 second, and then, the vehicle was steered to the left around 6 second. Owing to this vehicle movement, the estimated slip angle value $\alpha_E$ became a negative value. When the vehicle runs on a bank road, the steering neutral point moves (in FIG. 7, the steering neutral point moves in a positive direction). Therefore, the slip angle used by the grip degree estimating portion 30 needs to be modified according to the shift in the steering neutral point.

The estimated slip angle value $\alpha_E$ estimated based on the steering angle value became 0 until steering was started even after the vehicle entered the bank road (in an interval from 5 second to 6 second). The converted slip angle value $\alpha_T$ calculated based on the lateral force moved in the positive direction in accordance with the shift in the steering neutral point when the vehicle entered the bank road. However, the converted slip angle value $\alpha_T$ contained much noise due to road surface disturbance. Meanwhile, it is apparent that the integrated slip angle $\alpha_I$, which was obtained by integrating the signals using the filter processing, did not contain noise, and moved in the positive direction in accordance with the shift in the steering neutral point.

The grip degree estimating portion 30 estimates a grip degree $\epsilon$ which is equivalent to an excess of a frictional force in the lateral direction, based on the estimated SAT value $T_{SAT}$ estimated by the SAT estimating portion 23 and the integrated slip angle $\alpha_I$ calculated by the summing device 29.

The grip degree $\epsilon$ is a ratio between the estimated SAT value $T_{SAT}$ and a SAT reference value $T_{SATO}$, and is represented by the following equation (19).

$$\varepsilon \cong \frac{T_{SAT}}{T_{SATO}} \tag{19}$$

The SAT reference value $T_{SATO}$ is a SAT value of a linear model, that is, a model which is made linear using a slip angle 0, and is a SAT value in a high grip state, that is, a state where a grip degree is 1. When an inclination of the SAT value with respect to the slip angle at a zero point is $K_0$, the SAT reference value $T_{SATO}$ is represented as a product of the inclination $K_0$ and the integrated slip angle $\alpha_I$. Therefore, the grip degree $\epsilon$ is represented by the following equation (20).

$$\varepsilon \cong \frac{T_{SAT}}{T_{SATO}} = \frac{T_{SAT}}{K_0 \cdot \alpha_1} \tag{20}$$

The grip estimating portion 30 calculates the grip degree $\epsilon$ using the estimated SAT value $T_{SAT}$ and the integrated slip angle $\alpha_I$, according to the equation (20), and supplies the grip degree estimating portion 31 with the grip degree $\epsilon$.

The invention is not limited to a configuration in which the grip degree estimating portion 30 estimates the grip degree $\epsilon$ using the aforementioned method. For example, the grip degree $\epsilon$ may be represented using a function of the SAT reference value $T_{SATO}$ and the estimated SAT value $T_{SAT}$. Alternatively, the grip degree $\epsilon$ may be represented using a two-dimensional map of the SAT reference value $T_{SATO}$ and the estimated SAT value $T_{SAT}$.

Figure 8:
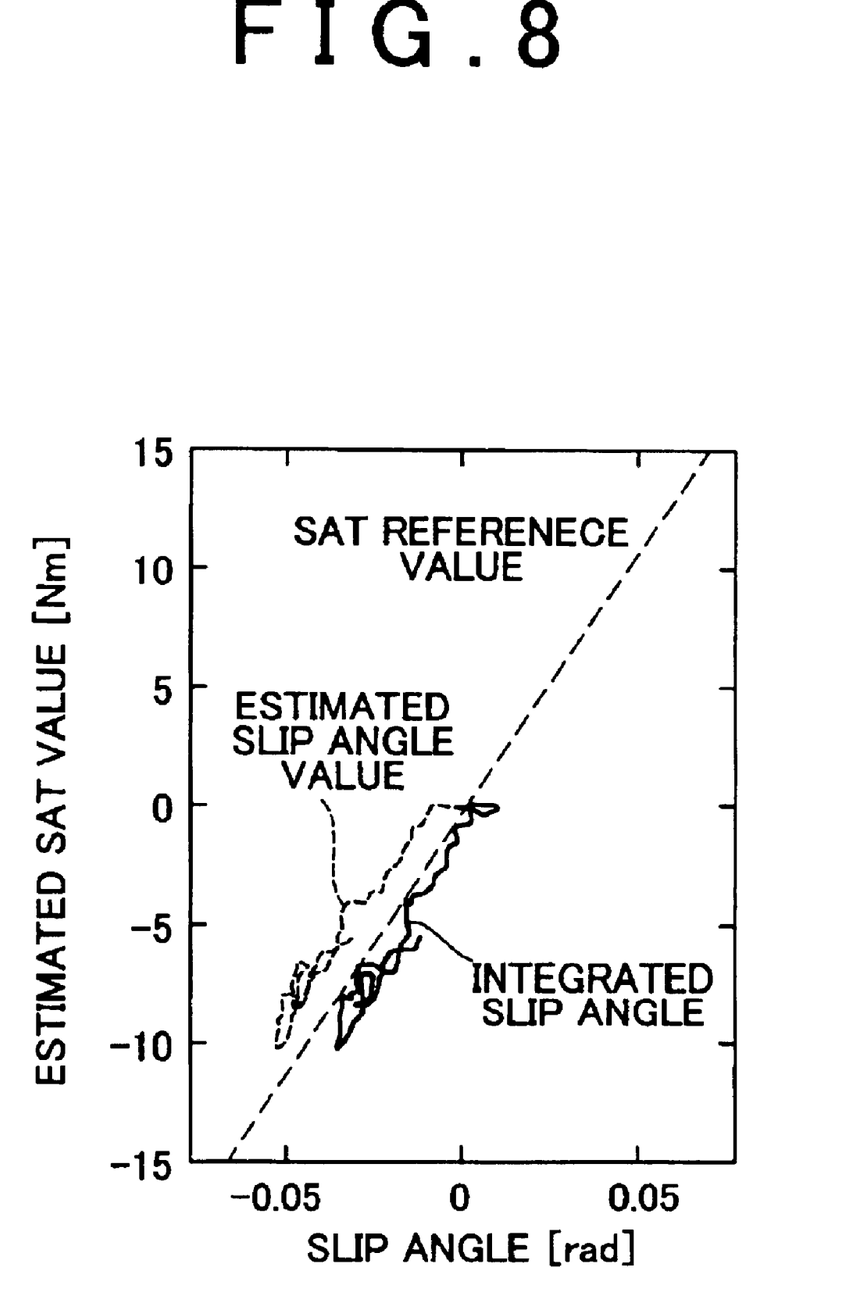
FIG. 8 is a chart showing the estimated SAT value with respect to the slip angle during running on a dry asphalt bank road.

FIG. 8 is a chart showing the estimated SAT value with respect to the slip angle during running on a dry asphalt bank road. A solid line indicates a case where the integrated slip angle $\alpha_I$ is used as a slip angle, and a dotted line indicates a case where the estimated slip angle value $\alpha_E$ is used as a slip angle. For reference, a dashed line indicates the SAT reference value $T_{SATO}$.

Figure 9A:
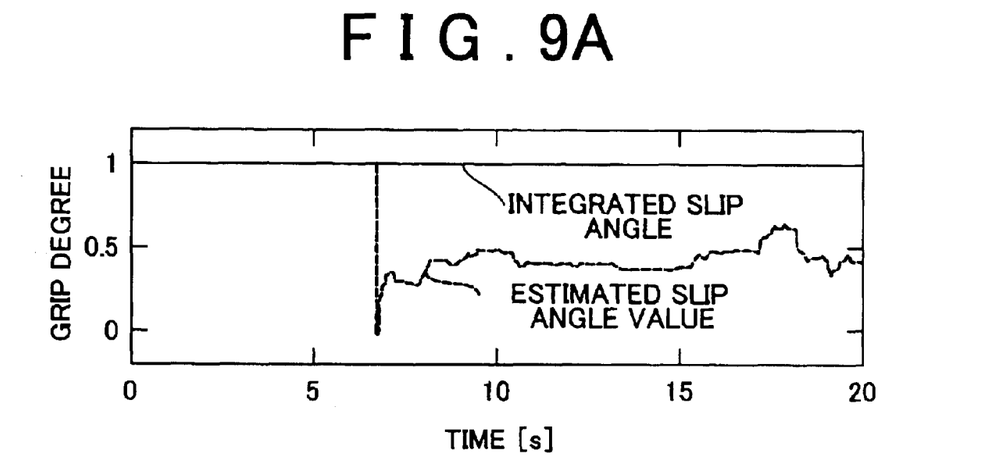
FIG. 9A is a chart showing a grip degree during running on a dry asphalt bank road.
Figure 9B:
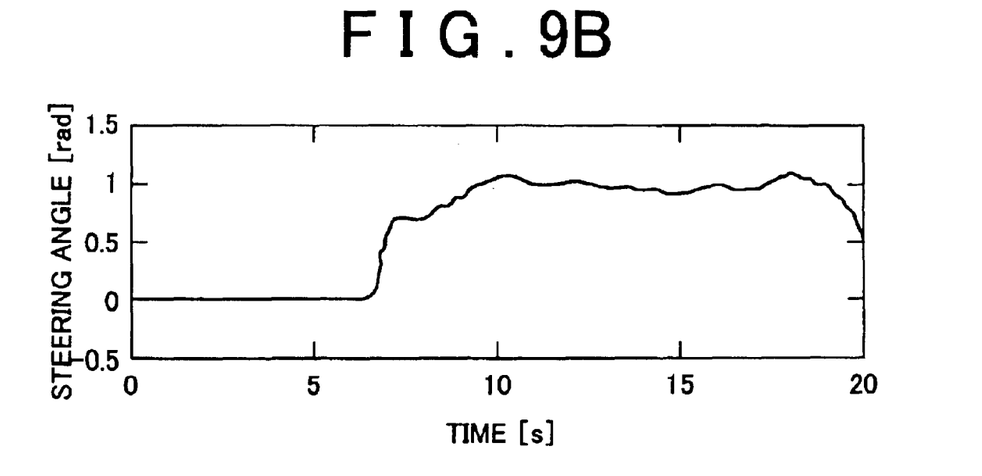
FIG. 9B is a chart showing a time-dependent waveform of the steering angle.

FIG. 9A and FIG. 9B indicate data measured in the experiment shown in FIG. 8. FIG. 9A is a chart showing a grip degree during running on a dry asphalt bank road, and FIG. 9B is a chart showing a time-dependent waveform of the steering angle. In FIG. 9A, a solid line indicates a grip degree calculated using the integrated slip angle $\alpha_I$, and a dotted line indicates a grip degree calculated using the estimated slip angle value $\alpha_E$. Further, when the calculated grip degree exceeds 1, the grip degree is set to 1.

Since the estimated slip angle value $\alpha_E$ is influenced by the shift in the steering neutral point during running on a bank road, the estimated slip angle value $\alpha_E$ varied in the negative direction, as shown in FIG. 8. As a result, the absolute value of the estimated slip angle value $\alpha_E$ became small as compared with the absolute value of the SAT reference value $T_{SATO}$. Also, the grip degree became small, as shown in FIG. 9A.

Meanwhile, the integrated slip angle $\alpha_I$ is not influenced by the shift in the steering neutral point even during running on a bank road. In other words, as shown in FIG. 8, the relation of the estimated SAT value with respect to the integrated slip angle $\alpha_I$ substantially matched a straight line indicating the SAT reference value $T_{SATO}$. Also, the grip degree became 1, as shown in FIG. 9A.

According to the results of the experiment described above, in the case of a dry asphalt bank road, the grip degree constantly needs to be approximately 1. However, the grip degree calculated using the estimated slip angle value $\alpha_E$ became a value smaller than 1, and it is apparent that this value is erroneous. Meanwhile, the grip degree calculated using the integrated slip angle $\alpha_I$ constantly became 1. Therefore, it was confirmed that the grip degree was accurately estimated when the integrated slip angle $\alpha_I$ was used.

The road surface $\mu$ value estimating portion 31 estimates a road surface $\mu_{est}$ value based on the grip degree $\epsilon$ and the lateral acceleration $g_y$ when the grip degree $\epsilon$ estimated by the grip degree estimating portion 30 becomes equal to or smaller than a predetermined reference value (for example, when the grip degree $\epsilon$ becomes equal to or smaller than 0.5). The road surface $\mu_{est}$ value is represented by the following equation (21).

$$\mu_{est} = \frac{g_{fy}}{(1 - \varepsilon)g} \tag{21}$$

In the equation, g is a gravitational acceleration. Also, $g_{fy}$ is a front wheel position lateral acceleration, and is represented by the following equation (22).

$$g_{fy} = \frac{L_r g_y + \frac{I_Z}{M}\frac{dr}{dt}}{L_f + L_r} \tag{22}$$

The estimation accuracy of the road surface $\mu_{est}$ value thus obtained is improved as the grip degree $\epsilon$ decreases, that is, the grip degree $\epsilon$ approaches a limit value. Accordingly, when the grip degree $\epsilon$ becomes equal to or smaller than the predetermined reference value as described above, the road surface $\mu$ estimating portion 31 estimates the road surface $\mu_{est}$ value according to the equations (21) and (22).

Figure 10A:
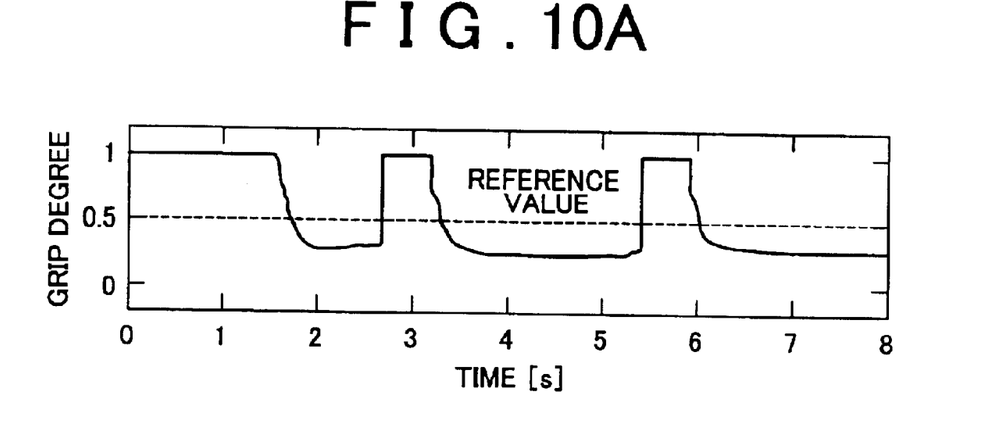
FIG. 10A is a chart showing the grip degree during running on an ice road at a speed of 40 km/h.
Figure 10B:
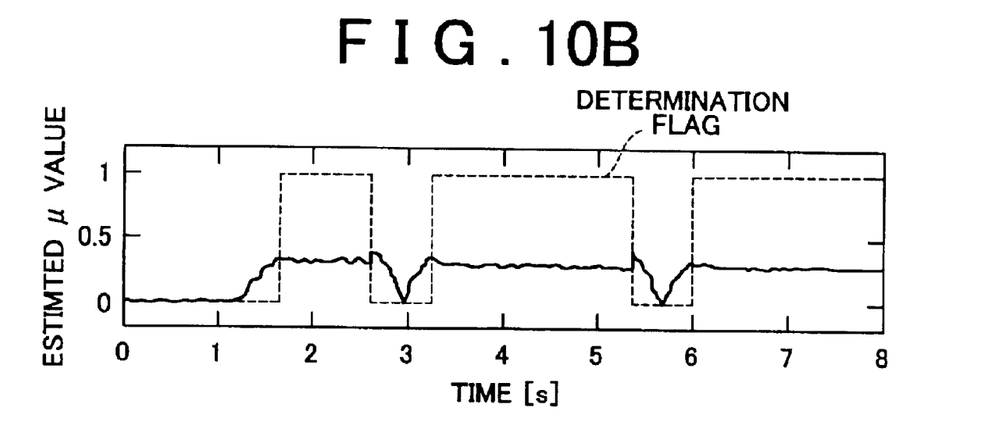
FIG. 10B is a chart showing a road surface $\mu_{est}$ value (an estimated $\mu$ value)
Figure 10C:
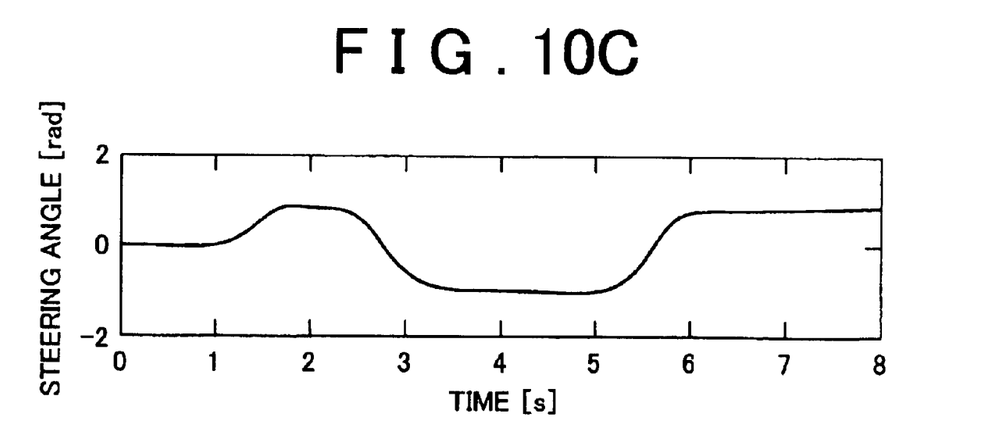
FIG. 10C is a chart showing a time-dependent waveform of the steering angle.

FIG. 10A is a chart showing the grip degree during running on an ice road at a speed of 40 km/h, FIG. 10B is a chart showing the road surface $\mu_{est}$ value (an estimated $\mu$ value), and FIG. 10C is a chart showing a time-dependent waveform of the steering angle. In FIG. 10B, a determination flag becomes 1 when the grip degree becomes equal to or smaller than the reference value, and becomes 0 when the grip degree exceeds the reference value. According to FIG. 10B, when the determination flag was 1, the estimated $\mu$ value constantly became approximately 0.3 which is substantially equal to the road surface $\mu$ value of an ice road.

Figure 11A:
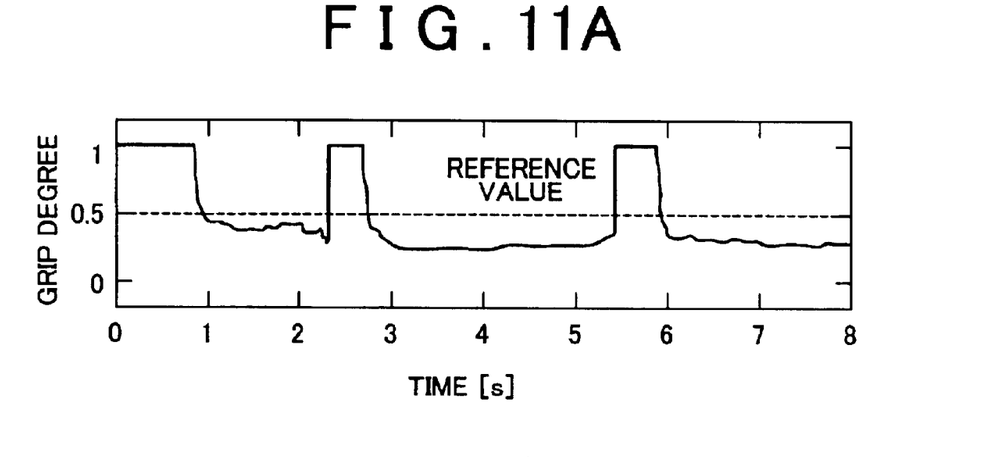
FIG. 11A is a chart showing the grip degree during running on a pressed snow road at a speed of 40 km/h.
Figure 11B:
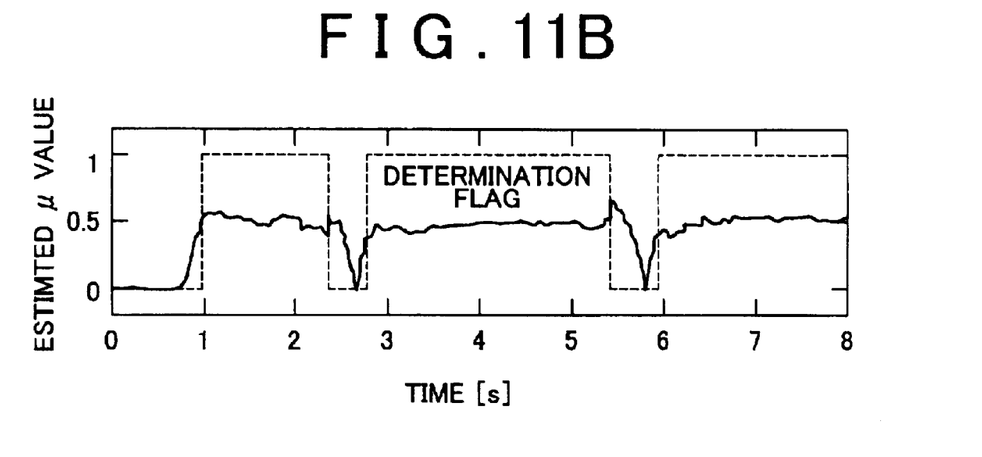
FIG. 11B is a chart showing the road surface $\mu_{est}$ value (the estimated $\mu$ value)
Figure 11C:
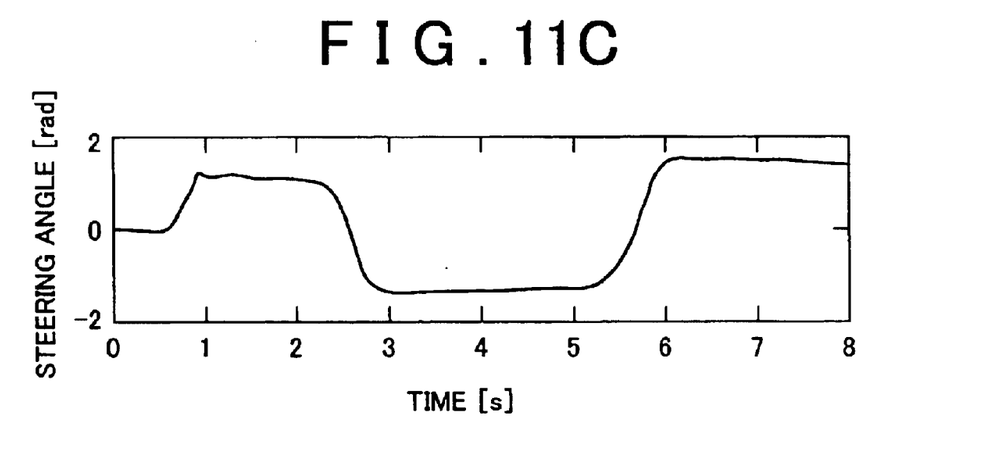
FIG. 11C is a chart showing a time-dependent waveform of the steering angle.

FIG. 11A is a chart showing the grip degree during running on a pressed snow road at a speed of 40 km/h, FIG. 11B is a chart showing the road surface $\mu_{est}$ value (the estimated $\mu$ value), and FIG. 11C is a chart showing a time-dependent waveform of the steering angle. According to FIG. 11B, when the determination flag was 1, the estimated $\mu$ value constantly became large as compared with the case of running on the ice road, and constantly became approximately 0.5 which is substantially equal to the road surface $\mu$ value of a pressed snow road.

Figure 12A:
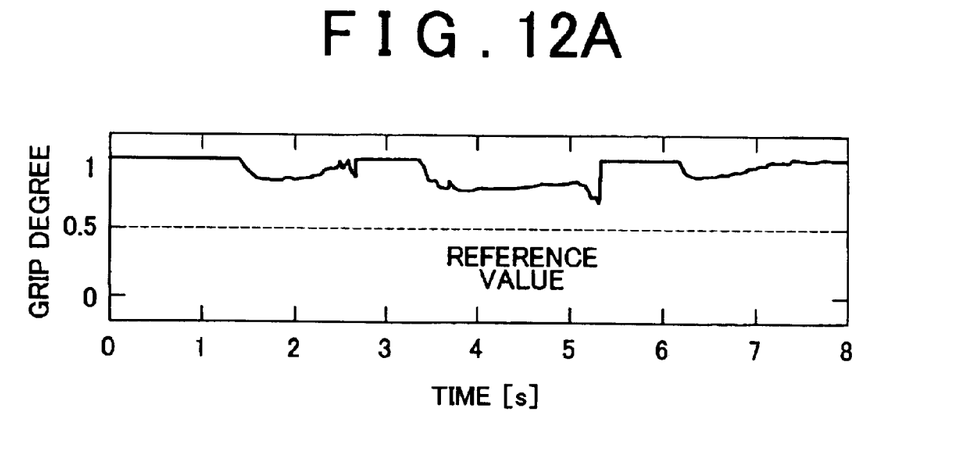
FIG. 12A is a chart showing the grip degree during running on an asphalt road at a speed of 40 km/h.
Figure 12B:
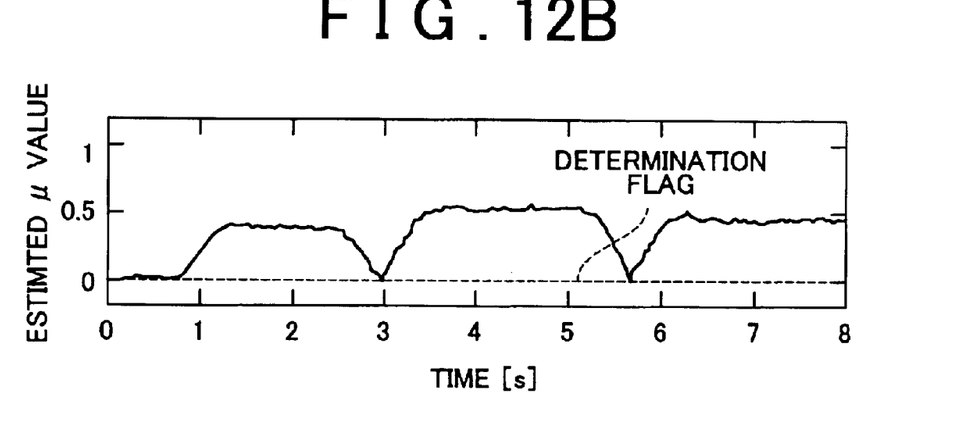
FIG. 12B is a chart showing the road surface $\mu_{est}$ value (the estimated $\mu$ value)
Figure 12C:
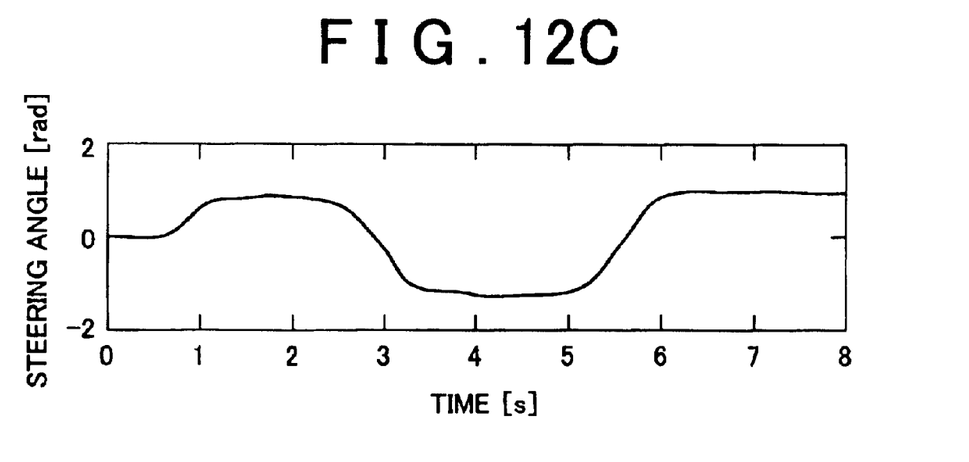
FIG. 12C is a chart showing a time-dependent waveform of the steering angle.

FIG. 12A is a chart showing the grip degree during running on an asphalt road at a speed of 40 km/h, FIG. 12B is a chart showing the road surface $\mu_{est}$ value (the estimated $\mu$ value), and FIG. 12C is a chart showing a time-dependent waveform of the steering angle. According to FIG. 12B, the grip degree constantly became equal to or larger than the reference value (0.5), and the determination flag constantly became 0. In other words, when running on a dry asphalt road at a speed of 40 km/h, there was a sufficient frictional force left between the tires and the road surface, though steering was performed in approximately the same manner as in the experiments shown in FIG. 10C and FIG. 11C. Thus, the grip degree $\epsilon$ was higher than the reference value, and accordingly, the estimated $\mu$ value was not estimated.

As described above, the road surface friction state estimating apparatus according to the embodiment can accurately estimate the grip degree $\epsilon$ which is equivalent to an excess of a frictional force in the lateral direction, by calculating the SAT reference value $T_{SATO}$ based on the integrated slip angle that has been extracted by the high pass filter 25 and the low pass filter 28, and calculating a ratio between the SAT reference value $T_{SATO}$ and the estimated SAT value $T_{SAT}$ estimated by the SAT estimating portion 23. In addition, the road surface friction state estimating apparatus according to the embodiment can accurately estimate the road surface $\mu$ value when the grip degree becomes equal to or smaller than the reference value.

Particularly, the road surface friction state estimating apparatus can accurately estimate a road surface friction state such as the grip degree $\epsilon$ and the road surface $\mu$ value, by making the estimated slip angle value $\alpha_E$ pass through the high pass filter 25 so as to remove a drift error caused by the shift in the steering neutral point during running on a bank road. Further, the road surface friction state estimating apparatus can accurately estimate a road surface friction state without being influenced by road surface disturbance, by making the converted slip angle value $\alpha_T$ pass through the low pass filter 28.

The breakpoint frequency of the high pass filter 25 and the low pass filter 28 may be a fixed frequency. However, the breakpoint frequency needs to be set to be equal to or higher than a road surface cant change speed, that is, a speed at which a cant of a road surface changes. The road surface cant change speed is proportional to a vehicle speed. Thus, the high pass filter 25 and low pass filter 28 may be configured such that the breakpoint frequency becomes higher as the vehicle speed becomes higher.

Since the road surface friction state estimating apparatus is provided with the high pass filter 25 and the low pass filter 28 thus configured, the apparatus can accurately estimate a road surface friction state even when the vehicle enters a bank road at a high speed.

Also, the high pass filter 25 and the low pass filter 28 may be configured such that the breakpoint frequency becomes higher as a deviation between the estimated slip angle value $\alpha_E$ and the converted slip angle value $\alpha_T$ becomes larger. This is because the deviation between the estimated slip angle value $\alpha_E$ and the converted slip angle value $\alpha_T$ becomes large in the case where the vehicle runs on a bank road, or in the case where the relation between the lateral force and the slip angle becomes non-linear. In such a case, it is preferable to use the converted slip angle value $\alpha_T$ which is based on the front wheel lateral force $F_f$ that is not influenced by a change in the steering neutral point or the non-linear relation between the lateral force and the slip angle.

Since the road surface friction state estimating apparatus is provided with the high pass filter 25 and the low pass filter 28, the apparatus can increase a proportion of the converted slip angle value $\alpha_T$ based on the front wheel lateral force $F_f$ to the estimated slip angle value $\alpha_E$ based on the steering angle when using the converted slip angle value $\alpha_T$ and the estimated slip angle value $\alpha_E$ to obtain the integrated slip angle $\alpha_I$, according to the vehicle movement state. As a result, the road surface friction state estimating apparatus can accurately estimate a road surface friction state, for example, even when the vehicle suddenly enters a bank road, or the vehicle is suddenly brought into a spin state.

The invention is not limited to the aforementioned embodiments, and various modifications can be made to the design within the scope of the invention defined by claims.

For example, in the aforementioned embodiments, the grip degree and the road surface $\mu$ value are estimated using the electric power steering device. However, a hydraulic power steering device may be used. When the hydraulic power steering device is used, it is possible to estimate the grip degree and the road surface $\mu$ value in the same manner as in the aforementioned embodiments, by measuring a hydraulic pressure and the like of the hydraulic power steering device, and detecting torque corresponding to the steering torque and torque corresponding to the assist torque.

In the aforementioned embodiments, the high pass filter 25 and the low pass filter 28 are represented using the linear transfer functions. However, other functions may be used.

What is claimed is:

1. A road surface friction state estimating apparatus comprising:

a self aligning torque estimating portion which estimates self aligning torque applied to a tire;

a slip angle estimating portion which estimates a slip angle of the tire;

a high pass filter which performs high pass filter processing on the slip angle estimated by the slip angle estimating portion;

a lateral force calculating portion which calculates a lateral force applied to the tire;

a slip angle converting portion which converts the lateral force calculated by the lateral force calculating portion into a slip angle;

a low pass filter which performs low pass filter processing on the slip angle obtained by conversion by the slip angle converting portion;

a summing portion which sums the slip angle on which the high pass filter processing has been performed by the high pass filter and the slip angle on which the low pass filter processing has been performed by the low pass filter; and a road surface friction state estimating portion which estimates a road surface friction state based on the slip angle obtained by summation by the summing portion and the self aligning torque estimated by the self aligning torque estimating portion.

2. The apparatus according to claim 1, wherein the high pass filter and the low pass filter have the same breakpoint frequency.

3. The apparatus according to claim 2, wherein a value of the breakpoint frequency of the high pass filter and the low pass filter is set according to a vehicle movement state.

4. The apparatus according to claim 3, wherein the value of the breakpoint frequency is set so as to be higher as a vehicle speed is higher.

5. The apparatus according to claim 3, wherein the value of the breakpoint frequency is set so as to be higher as a deviation between the slip angle estimated by the slip angle estimating portion and the slip angle obtained by conversion by the slip angle converting portion is larger.

6. The apparatus according to claim 1, wherein a sum of a transfer function of the high pass filter and a transfer function of the low pass filter is 1.

7. The apparatus according to claim 1, wherein the road surface friction state estimating portion calculates a self aligning torque reference value based on the slip angle obtained by summation by the summing portion, and estimates a grip degree based on a ratio between the self aligning torque reference value and the self aligning torque estimated by the self aligning torque estimating portion.

8. The apparatus according to claim 7, wherein the road surface friction state estimating portion estimates a road surface friction coefficient based on the grip degree and a lateral acceleration.

9. The apparatus according to claim 8, wherein the road surface friction state estimating portion estimates the road surface friction coefficient when the grip degree becomes equal to or smaller than a reference value.

10. A road surface friction state estimating method comprising the steps of:

estimating self aligning torque applied to a tire;

estimating a slip angle of the tire;

performing high pass filter on the estimated slip angle;

calculating a lateral force applied to the tire;

converting the lateral force into a slip angle;

performing low pass filter processing on the slip angle obtained by conversion;

summing the slip angle on which the high pass filter has been performed and the slip angle on which the low pass filter has been performed; and estimating a road surface friction state based on the slip angle obtained by summation and the estimated self aligning torque.

* * * * *